United States Patent
Kobayashi

[11] Patent Number: 5,191,250
[45] Date of Patent: Mar. 2, 1993

[54] DC MOTOR WITH U-SHAPED ROTOR-COIL WIRE HAVING INCLINED INTERMEDIATE PORTION

[75] Inventor: Kouji Kobayashi, Nitta, Japan

[73] Assignee: Mitsuba Electric Mfg. Co., Ltd., Gumma, Japan

[21] Appl. No.: 404,213

[22] Filed: Sep. 7, 1989

[30] Foreign Application Priority Data

Sep. 12, 1988 [JP] Japan .................... 63-227768
Sep. 12, 1988 [JP] Japan .................... 63-227769

[51] Int. Cl.⁵ ............................................. H02K 1/22
[52] U.S. Cl. ................................... 310/261; 310/89; 310/198; 310/208; 310/234
[58] Field of Search .............. 310/261, 262, 264, 265, 310/267, 198, 200–208, 212, 216, 177, 179, 180, 184, 42, 195, 233, 234, 89

[56] References Cited

U.S. PATENT DOCUMENTS

| | | | |
|---|---|---|---|
| 2,115,570 | 4/1938 | Compton, Jr. | 310/208 |
| 4,559,463 | 12/1985 | Kobayashi | 310/211 |
| 4,707,629 | 11/1987 | Wasko | 310/198 |
| 4,827,172 | 5/1989 | Kobayashi | 310/208 |

FOREIGN PATENT DOCUMENTS

| | | | |
|---|---|---|---|
| 2741036 | 5/1979 | Fed. Rep. of Germany | 310/264 |
| 0677857 | 7/1929 | France | 310/265 |
| 0485357 | 3/1970 | Switzerland | 310/261 UX |
| 2202388 | 9/1988 | United Kingdom | 310/198 |

OTHER PUBLICATIONS

Patent Abstracts of Japan, vol. 8, No. 49 (E-230) (1486) Mar. 6, 1984 & JP-A-58 201550 (Mitsuba) Nov. 24, 1983.

Primary Examiner—R. Skudy
Attorney, Agent, or Firm—Darby & Darby

[57] ABSTRACT

A DC motor includes a cylindrical rotor core and a rotor coil wound around the rotor core. The rotor core has shallower slots and deeper slots, circumferentially and alternately disposed in the peripheral surface thereof at angular intervals about the center axis thereof. Each shallower slot includes inner and outer radially aligned sections, while each deeper slot includes inner and outer radially spaced sections and a neck section interposed between the corresponding inner and outer sections. The rotor coil includes U-shaped formed wires, each including inner and outer leg portions and an intermediate portion which interconnects the inner and outer leg portions. The angle between the inner leg portion and the intermediate portion is larger than 90°. Each of the formed wires has its inner leg portion inserted in the inner section of a shallower or deeper slot and has its outer leg portion inserted in the outer section of the Nth slot as counted in a circumferential direction from the slot in which the corresponding inner leg portion is inserted, so that its intermediate portion projects from and is inclined to the rear end face of the rotor core. N is a natural number greater than two. The intermediate portions of the formed wires occupy a donut-shaped volume on the rear end face of the rotor core.

24 Claims, 11 Drawing Sheets

DC MOTOR WITH U-SHAPED ROTOR-COIL WIRE HAVING INCLINED INTERMEDIATE PORTION

BACKGROUND OF THE INVENTION

This invention relates to a DC motor such as a starting motor for an engine or the like, and more specifically, relates to a motor with U-shaped rotor-coil wires, each having two parallel leg portions and an intermediate portion inclined to a rotor-core end.

FIG. 1 shows a typical conventional DC motor in which a rotor 20 is rotatably disposed in a motor case 22. The rotor 20 consists of a rotation shaft 24, a cylindrical rotor core 30, and a rotor coil 36. The opposite end portions of the rotation shaft 24 is supported via bearings 32 and 34 by the opposite end brackets 26 and 28 of the motor case 22. The rotor core 30 is coaxially disposed and fixed onto the shaft 24 so that the opposite end faces 38 and 40 of the core 30 are opposed to the brackets 26 and 28, respectively.

As shown in FIG. 2, a plurality of slots 42 are formed in the peripheral face of the rotor core 30 in a conventional manner. An axially extending tooth 44 is formed between any two adjacent slots 42 and 42. Every slot 42 is of a radially elongated cross section of the same size, and has two radially aligned sections, namely inner and outer sections 46 and 48. By utilizing these slots 42, the rotor coil 36 is wound around the core 30.

FIG. 3 shows the core 30 with the coil 36 wound therearound in the manner of double-layer wave winding. This rotor coil 36 consists of a plurality of substantially inflexible U-shaped lead wires 50. As shown in FIGS. 4 and 5 (FIG. 4 is a perspective view), each of the lead wires 50 includes two spaced parallel leg portions 52 and 54 of the same length $L_0$ and an intermediate portion 56 twisted in a substantially spiral fashion and interconnecting the leg portions 52 and 54.

To form the coil 36, these wires 50 are inserted from the rear end face 40 of the core 36 into the slots 42 in such a manner that one of the leg portions of a wire 50, i.e., the leg portion 52 is received in the outer section 48 of a slot 42, and the other leg portion 54 of the same wire 50 is received in the inner section 46 of another slot 42 (i.e., the sixth slot in FIG. 3). As a result, the intermediate portions 56 of the wires 50, each straddling a proper number of teeth 44 (five teeth in FIG. 3), project from the rear end face 40 of the core 30 (see FIG. 1).

On the rear end face 40 of the core 36, as shown in FIG. 3, the intermediate portions 56 of the wires 50, superficially, are laid substantially side by side, however in fact, the intermediate portions 56 cross over and under the neighboring intermediate portions 56 as if they were twisted together. All the crossings of the intermediate portions 56 are not disposed over the slots 42 but some of the crossings are disposed closer to the center of the rear end face 40 than the slots 42. In other words, some of the crossings are disposed in a radially inner region of the rear end face 40, inside an imaginary circle 58 (see a phantom line in FIG. 2) defined by the bottoms or radially inner ends of the slots 42. This twisted arrangement of the intermediate portions 56 allows the bulk of the intermediate portions 56 to be distributed substantially evenly over the rear end face 40 from the circumference of the core 30 to the radially inner region (see FIG. 1). More specifically, the intermediate portions 56 occupy a relatively flat donut-shaped volume having equal and constant thickness instead of occupying a relatively hilly donut-shaped volume only over the slots 42. The intermediate portions 56 in this twisted arrangement, practically, project less from the rear end face 40 than the intermediate portions 56 of which the crossings are disposed only over the slots 42, and therefore help the overall axial length of the motor to be minimized. However, according to the conventional twisted arrangement, more of the radially inner region of the rear end face 40 tends to be occupied by the intermediate portions 56 as the number or density of the slots 42 increases or as the slots 42 become deeper without the diameter of the core 30 being increased. This tendency is inconvenient since intermediate portions disposed too close to the center of the rear end face 40 can cause an interference with a central projection 59 on the rear end bracket 28, the central projection 59 consisting of a boss 60, a shaft aligner 62, a stopper 64 and the like (see FIG. 1), the axial length of the central projection 59 being larger at its central portion than at its periphery. Even the overall length of the motor must be lengthened to assure an adequate space between the intermediate portions 56 and the central projection 59 and thereby avoid interference.

SUMMARY OF THE INVENTION

Accordingly, it is an object of the present invention to provide a DC motor having a rotor core with an appreciably increased number and/or depth of slots, in which a reasonable space can be assured between the rotor coil and the end bracket without the overall length of the motor being lengthened.

Another object of the present invention is to provide a DC motor in which rotor-coil wires or formed wires inserted into rotor-core slots of an appreciably increased number and/or depth are accommodated to a customary commutator.

In view of these and other objects, the present invention provides a DC motor including a motor case, a substantially cylindrical rotor core, and a rotor coil wound around the rotor core. The rotor core has a plurality of shallower slots and a plurality of deeper slots. The shallower and deeper slots are circumferentially and alternately disposed in the peripheral surface of the rotor core at angular intervals about the center axis of the rotor core. Each of the shallower and deeper slots extends axially from the front end face of the rotor core to the rear end face so that axially extending teeth are formed among the shallower and deeper slots. Each shallower slot includes inner and outer radially aligned sections. Each deeper slot includes inner and outer radially spaced sections and a neck section which is interposed between the corresponding inner and outer sections. The distance between the center axis of the rotor core and the outer section of each shallower slot is generally equal to the distance between the center axis of the rotor core and the outer section of each deeper slot, while the distance between the inner and outer sections of each deeper slot is larger than the distance between the inner and outer sections of each shallower slot. The neck section of each deeper slot is of a circumferential length substantially smaller than the circumferential lengths of the inner and outer sections of each deeper slot. On the other hand, the rotor coil comprises a plurality of first U-shaped formed wires and a plurality of second U-shaped formed wires. Each of the first and second formed wires includes inner and outer leg portions and an intermediate portion. Each of the inner and outer leg portions has distal and proximal ends, and the intermediate portion interconnects the proximal ends of the inner and outer leg portions. The angle defined between the inner leg portion and the intermediate portion is larger than 90°. Each of the first and second formed wires has its inner leg portion inserted in the inner section of a shallower or deeper slot (where N is a positive number greater than two) and has its outer leg portion inserted in the outer section of the Nth slot as counted in a circumferential direction from the shallower or deeper slot in which the corresponding inner leg portion is inserted, so that each of the first and second formed wires straddles (N−1)· teeth with its intermediate portion projecting from and being inclined to the rear end face of the rotor core. The intermediate portions of the first and second formed wires occupy a donut-shaped volume on the rear end face of the rotor core. With the above-mentioned rotor-core wire arrangement, the thickness of the donut-shaped volume becomes larger at its outer periphery than at its inner periphery, in other words, the majority of the bulk of the intermediate portions is distributed near the periphery of the rotor core and relatively little of the bulk is distributed near the center of the core. This reduced bulk of the intermediate portions near the center allows a projection, such as a boss and a shaft aligner on the motor case, to be accommodated closer to the rotor core, and assures an adequate space between the projection and the intermediate portions without lengthening the overall length of the DC motor.

The inner leg portions of the first formed wires may be inserted respectively in the inner sections of the shallower slots, and the inner leg portions of the second formed wires may be inserted respectively in the inner sections of the deeper slots. In this case, the intermediate portion of each first formed wire is routed over the neck section of a deeper slot which intervenes between the corresponding inner and outer leg portions so as to avoid covering the inner and outer sections of the intervening deeper slot, while the intermediate portion of each second formed wire is routed along the intermediate portion of a first formed wire preceding in the circumferential direction and, at the same time, crosses over the intermediate portion of a first formed wire following in the circumferential direction.

It is preferred that the intermediate portion of each of the first and second formed wires appears straight when the intermediate portion is viewed from a plane parallel to both the corresponding inner and outer leg portions, and the angle defined between the outer leg portion and intermediate portion of each of the first and second formed wires is smaller than 90°.

Otherwise, it is preferred that the intermediate portion of each of the first and second formed wires appears bowed or double-inclined when the intermediate portion is viewed from a plane parallel to both the corresponding inner and outer leg portions, and the angle defined between the outer leg portion and intermediate portion of each of the first and second formed wires is larger than the angle defined between the inner leg portion and intermediate portion of each of the first and second formed wires.

The DC motor may further comprises a commutator having a plurality of notches circumferentially disposed in the peripheral surface thereof at equal angular intervals about the axis of the commutator. Each of the notches may include inner and outer radially aligned sections. The circumferential length of each notch may be generally equal to the diameter of a distal end of each of the first and second formed wires. The distance between the axis of the commutator and the inner section of each notch may be substantially larger than the distance between the center axis of the rotor core and the inner section of each deeper slot. The distal ends of the first and second formed wires may be of a diameter substantially smaller than the diameter of the other portions of the first and second formed wires, and may project from the front end face of the rotor core toward the commutator so as to be received in the notches of the commutator. In this case, it is preferred that the distal ends projecting from the inner sections of the deeper slots are bent radially outward as so to be accommodated to the inner sections of the notches.

BRIEF DESCRIPTIONS OF THE DRAWINGS

DETAILED DESCRIPTION OF THE PREFERRED EMBODIMENT

Figure 1:
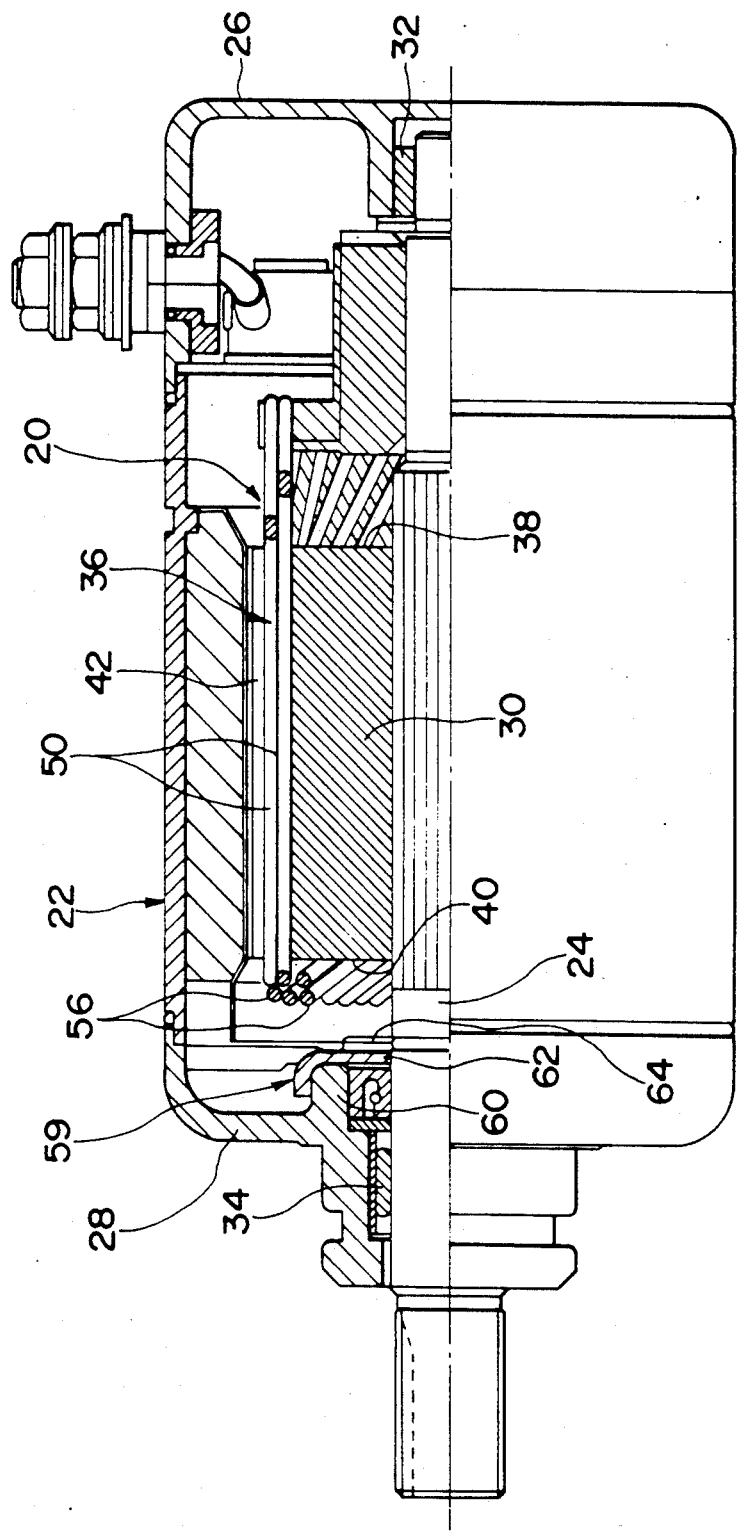
FIG. 1 is a side-elevational view, partly in section, of a conventional DC motor.
Figure 2:
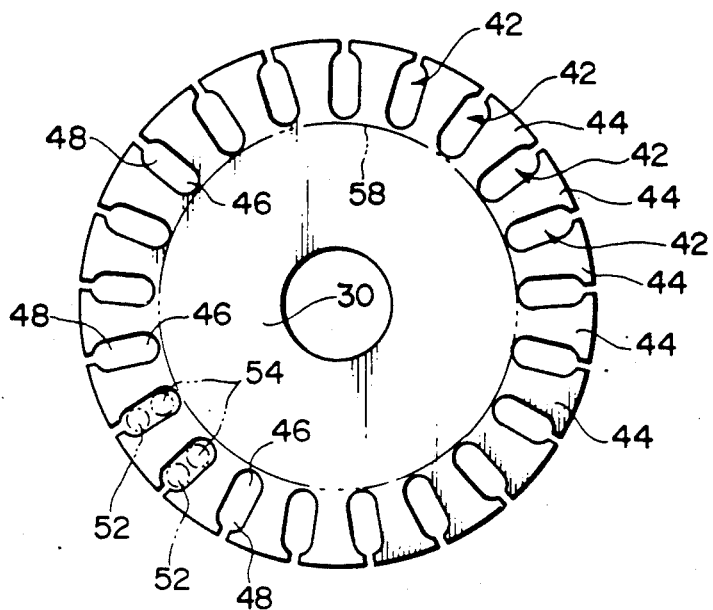
FIG. 2 is a front view of a rotor core in FIG. 1.
Figure 3:
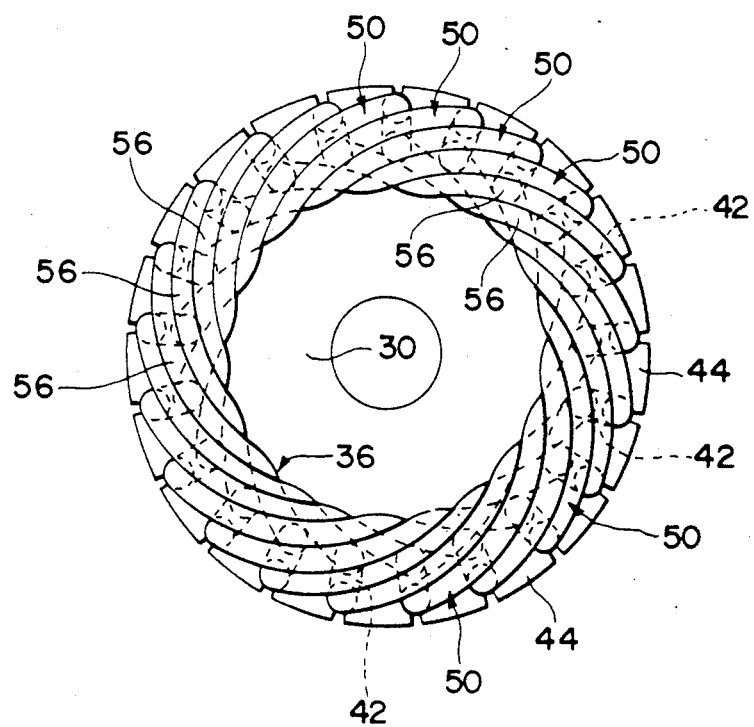
FIG. 3 is a rear view of the rotor core in FIG. 1, showing a rotor coil wound therearound.
Figure 4:
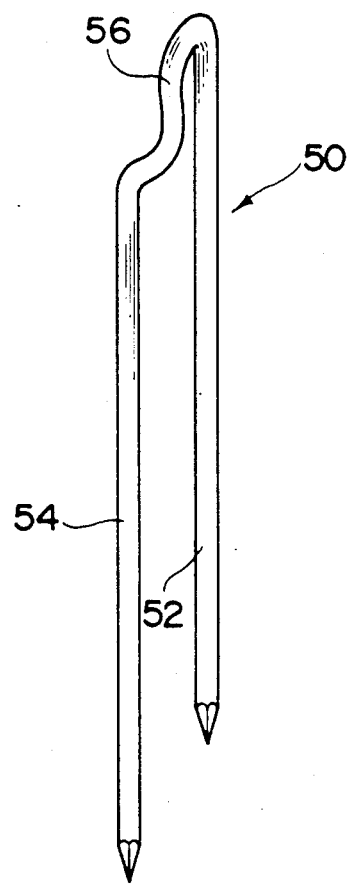
FIG. 4 is a perspective view of a U-shaped formed wire in FIG. 1.
Figure 5:
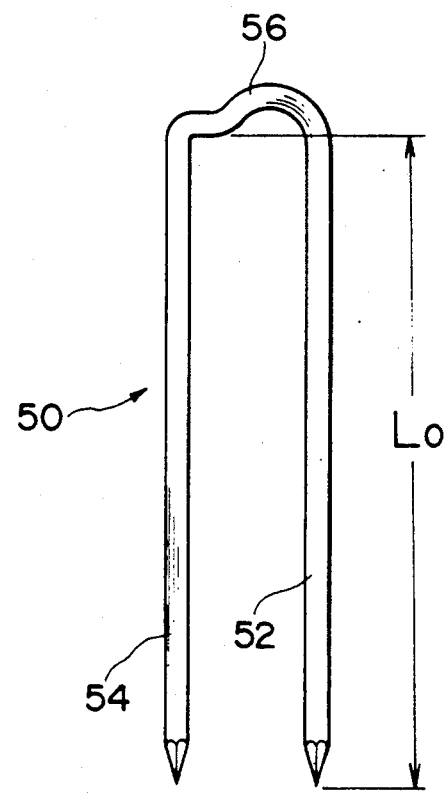
FIG. 5 is a side-elevational view of the U-shaped formed wire in FIG. 1.

In FIGS. 6 to 23, the same reference characters as shown in FIGS. 1 to 5 designate corresponding parts, and thus descriptions of the corresponding parts are omitted.

Figure 6:
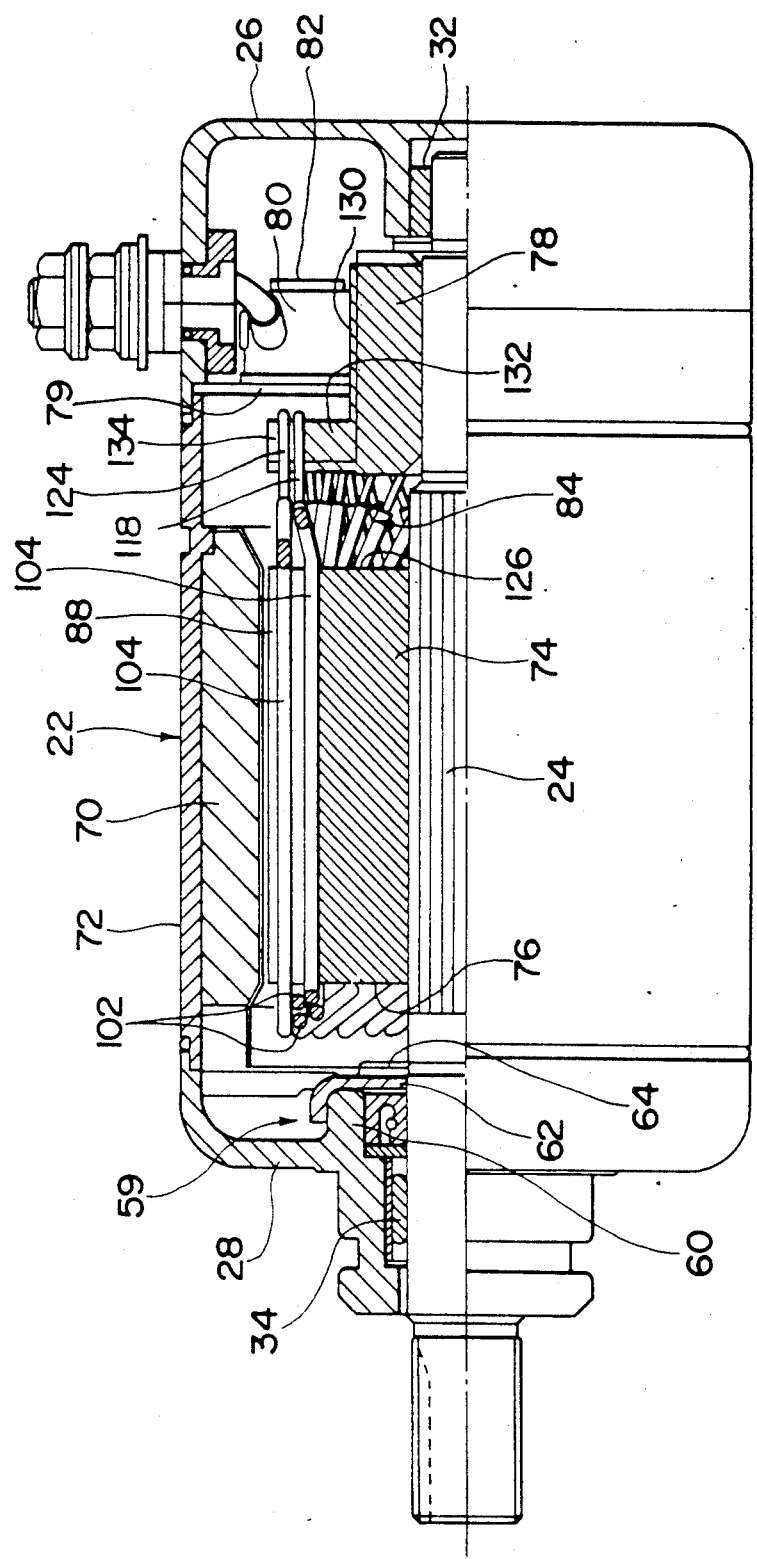
FIG. 6 is a side-elevational view, partly in section, of a DC motor according to the present invention.

FIG. 6 shows a multipolar DC starting motor according to the present invention. Reference numeral 70 designates a plurality of permanent magnets (only one of which is shown in FIG. 6, however, there are six magnets in this embodiment) circumferentially disposed and attached to the inner surface of a cylindrical yoke 72 of a motor case 22. A cylindrical rotor core 74 is rotatably disposed in the motor case 22 in a conventional manner. A rear end bracket 28 has a central projection 59 protruding toward the rear end face 76 of the core 74 and consisting of a boss 60, an annular shaft aligner 62, and an annular stopper 64. The boss 60 receives and rotatably supports the rear end portion of a rotation shaft 24. The shaft aligner 62 retains the rotation shaft 24 to be coaxial with the yoke 72. The stopper 64 prevents axial movement of the shaft aligner 62. This projection 59 is of a substantially annular configuration and the maximum outer diameter of the projection 59 is considerably smaller than the diameter of the rotor core 74, however, the axial length of the projection 59 is larger at its central portion than at its periphery.

A conventional commutator 78 of a diameter generally equal to the diameter of the rotor core 74 is coaxially and fixedly disposed on the front end portion of the rotation shaft 24, and is opposed to the front end face 126 of the core 74. Brush holders 80 (only one of which is shown in FIG. 1) are secured to a brush stay 79 and are disposed around the commutator 78 at angular intervals about the shaft 24 so that brushes 82 held by the brush holders 80 are in sliding electrical contact with the commutator 78. The commutator 78 is electrically connected to a rotor coil or windings 84 as will be described later on.

The rotor core 74 in this embodiment corresponds to a rotor core disclosed in U.S. Pat. No. 4,827,172, entitled DC MOTOR WITH ROTOR SLOTS CLOSELY SPACED, of the same inventor and assignee as herein. To describe the structure of the core 74 specifically, the cylindrical rotor core 74 is a laminated core formed of a plurality of annular iron sheets of the same size and shape. Each iron sheet has alternating oval and dumbbell-shaped notches equally spaced along the periphery of the iron sheet, with the outer axes of the notches radially disposed, and these oval and dumbbell-shaped notches communicate with the periphery of the iron sheet. The identical iron sheets are stacked in a multilayered fashion so that the oval notches of all the iron sheets are aligned and thereby form shallower slots 86 (see FIG. 7) of an oval cross section through the axial length of the rotor core 74. The dumbbell-shaped notches are similarly aligned to thereby form deeper slots 88 (also see FIG. 7) of a dumbbell-shaped cross section through the axial length of rotor core 74. That is to say, the rotor core 74 has shallower and deeper slots 86 and 88 circumferentially and alternately disposed in the peripheral face of the core 74 at equal angular intervals about the center axis of the core 74. As a result, a plurality of axially extending teeth 90 are formed among the shallower and deeper slots 86 and 88. These shallower and deeper slots 86 and 88 receive leg portions of U-shaped lead wires which will be described later on, in order to form the rotor coil 84 wound around the core 74.

FIG. 6 also shows opposite end bracket 26 and bearing 32 (see discussion concerning FIG. 1). FIG. 6 also shows, as will be discussed later in connection with other figures, distal end sections 118, 124 of first and second formed wires 102, 104, a riser portion 132 of a commutator segment 130 and a radially extending notch 134, which is provided with the riser portion 132.

Figure 7:
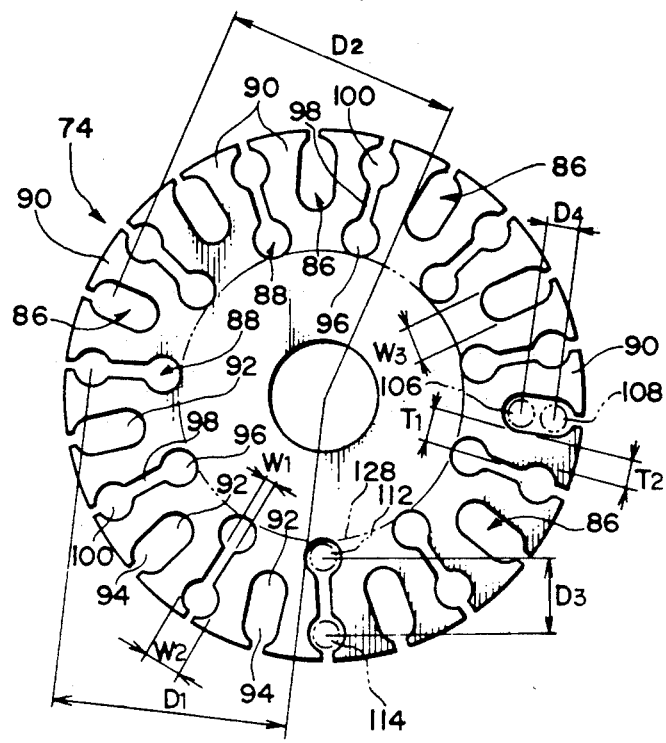
FIG. 7 is a front view of a rotor core in FIG. 6.

As best shown in FIG. 7, each of the shallower slots 86 includes two radially aligned sections, namely, inner and outer sections 92 and 94. Each deeper slot 88 which is interposed between two adjacent shallower slots 86 and 86 includes three radially aligned sections, namely, an inner section 96, a neck section 98 and an outer section 100. The inner and outer sections 96 and 100 are of the same circular cross section, and are radially spaced apart from each other with the neck section 98 interposed therebetween. The distance $D_1$ between the outer section 100 of each deeper slot 88 and the center axis of the rotor core 74 is equal to the distance $D_2$ between the outer section 94 of each shallower slot 86 and the center axis of the core 74. The distance $D_3$ between the inner and outer sections 96 and 100 of each deeper slot 88 is not less than twice, and preferably twice, as long as the distance $D_4$ between the inner and outer sections 92 and 94 of each shallower slots 86. The neck section 98 of each deeper slot 88 extends radially between the corresponding inner and outer sections 96 and 100 and communicates with both the inner and outer sections 96 and 100. Consequently, the neck section 98 of each deeper slot 88 is circumferentially adjacent to the inner sections 92 and 92 of the shallower slots 86 and 86 at the opposite sides of the corresponding deeper slot 88. The neck section 98 is of a width (circumferential length) $W_1$ considerably smaller than the width $W_2$ of the remainder of the deeper slot 88, the width $W_2$ being equal to the width $W_3$ of each shallower slot 86. Therefore, each tooth 90 is allowed to maintain a greater thickness than it would be allowed to in a conventional core with uniform slots. More specifically, although it is impossible for the conventional core to have teeth such that the thickness of the radially inner portion of a tooth is equal to or larger than that of the radially outer portion of the tooth, it is possible for the core in this embodiment. As shown in FIG. 7, the thickness $T_1$ of the inner portion of each tooth 90 is larger than the thickness $T_2$ of the outer portion of the tooth 90. For the aforementioned reason, this core 74 has the slots 86 and 88 of an increased number or density in comparison with a conventional uniform-slot core of the same diameter. If a conventional core of the same diameter as the core 74 has the same number of uniform slots as the slots 86 and 88, the thicknesses of the teeth of the conventional core is reduced to a dimension such that an abrupt increase in the magnetic resistance of the teeth is caused, or such that the teeth cannot maintain adequate mechanical strength.

Figure 8:
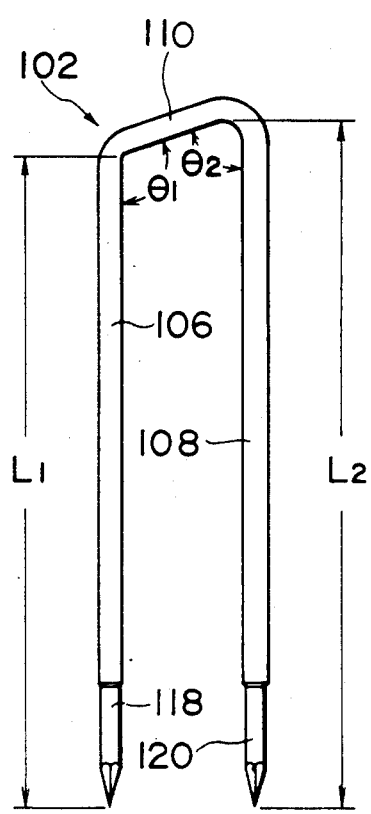
FIG. 8 is a side-elevational view of a first U-shaped formed wire in FIG. 6.
Figure 9:
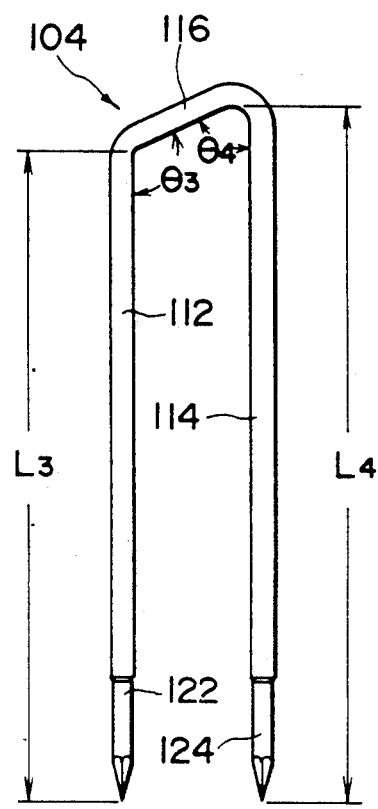
FIG. 9 is a side-elevational view of a second U-shaped formed wire in FIG. 6.
Figure 10:
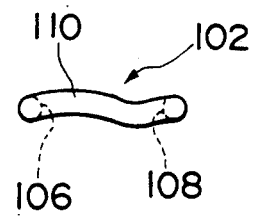
FIG. 10 is a rear view of the first U-shaped formed wire in FIG. 8.
Figure 11:
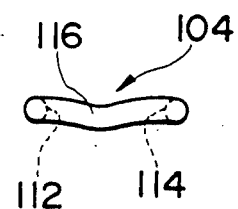
FIG. 11 is a rear view of the second U-shaped formed wire in FIG. 9.

The rotor core 74 having the aforementioned increased number of slots 86 and 88 is provided with the rotor coil 84 wound therearound. This coil 84 consists of a plurality of first formed wires 102 and a plurality of second formed wires 104. As shown in FIGS. 8 and 9, either the first formed wires 102 or the second formed wires 104 are of a substantially U-shape, and all the formed wires 102 and 104 are of a circular cross section having a slightly smaller diameter than the width $W_2$ or $W_3$ of the deeper or shallower slot 88 or 86. Each first formed wire 102, as shown in FIG. 8, includes: inner and outer straight leg portions 106 and 108; and an intermediate portion 110 appearing straight as viewed in FIG. 8 and appearing curved slightly as viewed in FIG. 10. Each second formed wire 104, as shown in FIG. 9, also includes: inner and outer straight leg portions 112 and 114; and an intermediate portion 116 which appears straight as viewed in FIG. 9 and which appears curved as viewed in FIG. 11.

As shown in FIG. 8, the inner and outer leg portions 106 and 108 of each first formed wire 102 are parallel to each other, and have respective lengths of $L_1$ and $L_2$ where $L_1$ is shorter than $L_2$. The distal ends of these leg portions 106 and 108 are aligned side by side in such a manner that an imaginary line extending between the two distal ends is perpendicular to both the leg portions 106 and 108. The proximal ends of the leg portions 106 and 108 are interconnected with each other by the intermediate portion 110, however, the intermediate portion 110 is not perpendicular to the leg portions 106 and 108 and is inclined to the imaginary line between the distal ends of the leg portions 106 and 108 since the lengths of the leg portions 106 and 108 are different. That is, as viewed in FIG. 8, the intermediate portion 110 and the inner leg portion 106 define an angle $\theta_1$ larger than 90° therebetween while the intermediate portion 110 and the outer leg portion 108 define an angle $\theta_2$ smaller than 90° therebetween. The manner in which the intermediate portion 110 is curved, will be described later on in relation to the arrangement of the intermediate portions on the rear end face 76 of the rotor core 74. The respective distal end sections 118 and 120 of the inner and outer leg portions 106 and 108 are formed thinner than the other sections. Each distal end section has a constant diameter for a certain length and is tapered off to a point. This configuration is given to each distal end section so as to accommodate each distal end section to electrical contact with the commutator 78, which will be described later in detail.

As shown in FIG. 9, the inner leg portion 112 of each second formed wire 104 is of a length $L_3$ generally equal to the length $L_1$ of the inner leg portion 106 of each first formed wire 102 while the outer leg portion 114 of the second formed wire 104 is of a length $L_4$ longer than the length $L_2$ of the outer leg portion 108 of each first formed wire 102, and preferably longer than the length $L_2$ by a dimension less than the diameter of a first formed wire 102. As viewed in FIG. 9, the intermediate portion 116 and the inner leg portion 112 define therebetween an angle $\theta_3$ larger than the angle $\theta_1$ while the intermediate portion 116 and the outer leg portion 114 define therebetween an angle $\theta_4$ smaller than the angle $\theta_2$. The manner in which the intermediate portion 116 is curved, will be described later on in relation to the arrangement of the intermediate portions on the rear end face 76 of the rotor core 74. The other features of each second formed wire 104 are identical to those of each first formed wire 102; for example, the respective distal end sections 122 and 124 of the inner and outer leg portions 112 and 114 are formed thinner than the other sections.

Figure 12:
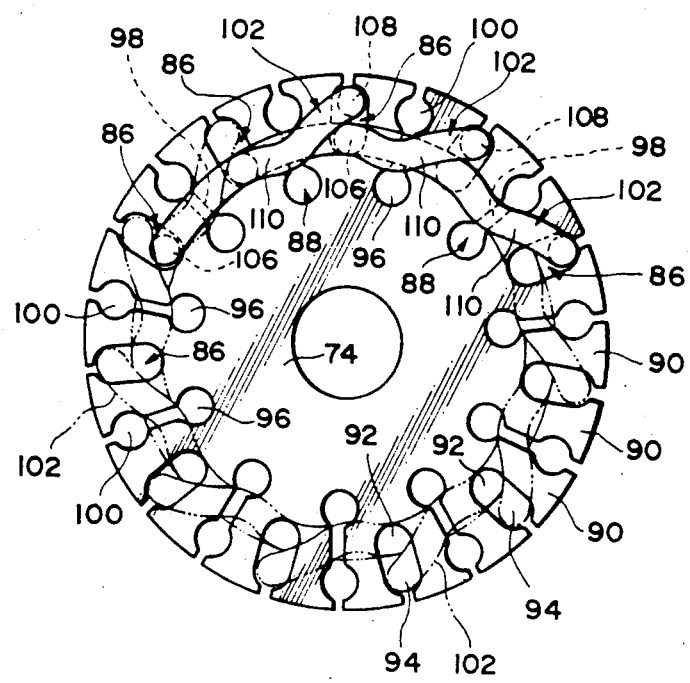
FIG. 12 is a rear view of the rotor core in FIG. 1, showing only a couple of the first U-shaped formed wires inserted in slots of the rotor core.
Figure 14:
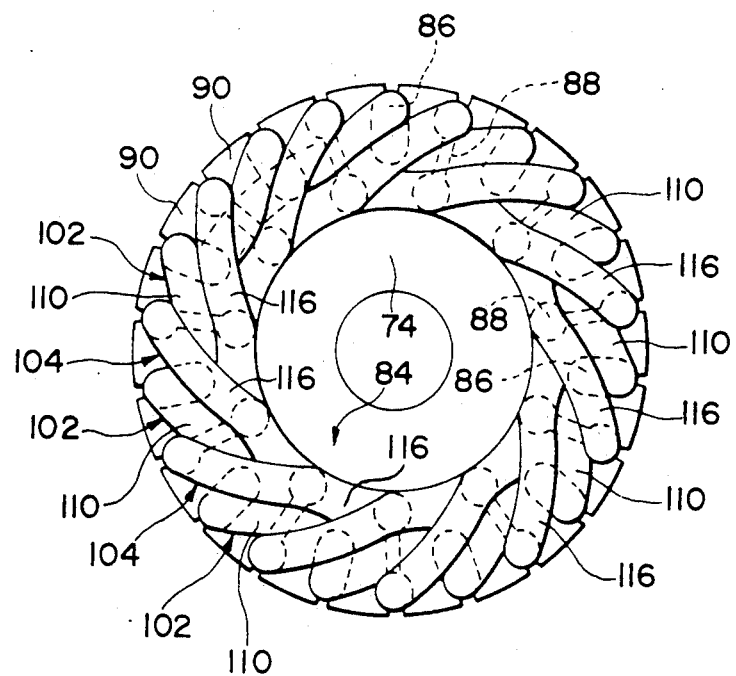
FIG. 14 is a rear view of the rotor core in FIG. 1, showing all the first and second U-shaped formed wires inserted in the slots.

The aforementioned first and second formed wires 102 and 104 are inserted from the rear end face 76 of the rotor core 74 into the slots 86 and 88 of the core 74, and, as shown in FIG. 14, form the rotor coil 84 wound around the core 74 in the manner of double-layer wave winding. In FIG. 14, the back pitch of the rotor coil 84 is four, while, as described later on, the front pitch is three. To describe the winding manner in detail, each first formed wire 102 has its inner leg portion 106 inserted in the inner section 92 of a shallower slot 86 (namely, a 1st shallower slot), and has its outer leg portion 108 inserted in the outer section 94 of another shallower slot 86, i.e., the 3rd shallower slot as counted clockwise from the 1st shallower slot 86 (see Figs. 12 and 15). As a result, the intermediate portions 110 of the first formed wires 102, each straddling four teeth 90, project from the rear end face 76 of the core 74 (see Figs. 6, 15 and 16), and the distal end sections 118 and 120 of the first formed wires 102 project from the front end face 126 of the core 74 (see FIGS. 19, 20 and 21). As viewed, in particular, in FIG. 16, the intermediate portions 110 appear inclined to the rear end face 76 of the core 74. As shown in FIG. 12, each intermediate portion 110 projecting from the rear end face 76 is routed over the neck sections 98 and 98 of two deeper slots 88 and 88 which intervene between the 1st and 3rd shallower slots 86 and 86 since each intermediate portion 110 is curved accordingly. This results in that the intermediate portion 110 of each first formed wire 102 covers neither the inner and outer sections 96 and 100 of the two intervening slots 88, nor the outer section 94 of the intervening shallower slot 86, i.e., the 2nd shallower slot, and thereby the insertion of the second formed wires 104 which follows the insertion of the first formed wires 102 is accommodated. Each intermediate portion 110 is disposed over the inner section 92 of the 2nd shallower slot 86, however, each intermediate portion 110 can allow an intermediate portion 110 which projects from the inner section 92 of the 2nd shallower slot 86 to be routed thereunder since, due to the specific shape of each first formed wire 102 having the inclined intermediate portion 110, a substantially right-triangle-shaped space is defined between each intermediate portion 110 and the rear end face 76 of the core 74 (see FIGS. 15 and 16).

Figure 13:
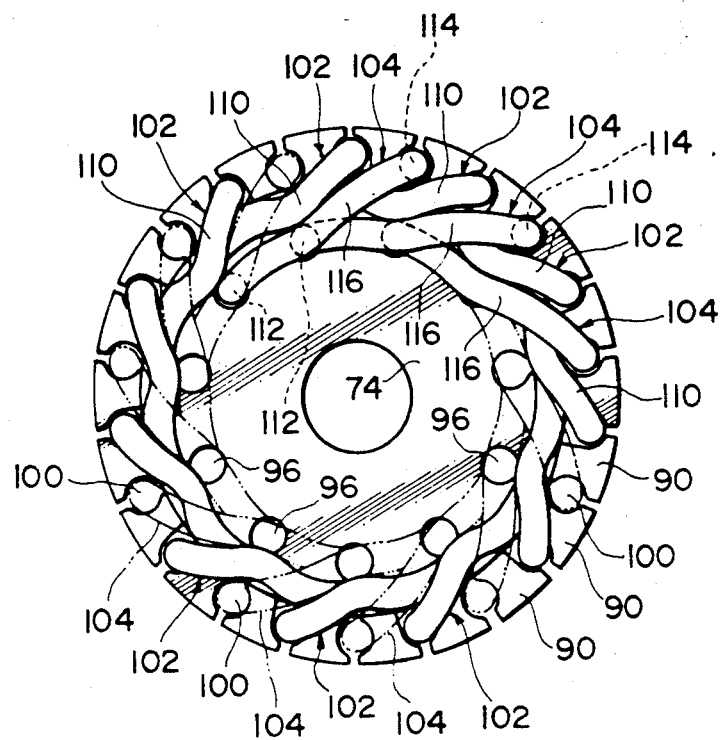
FIG. 13 is a rear view of the rotor core in FIG. 1, showing all the first U-shaped formed wires and a couple of the second U-shaped formed wires inserted in the slots.
Figure 15:
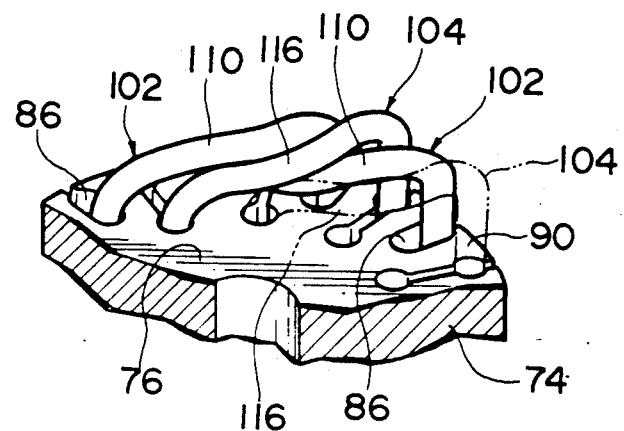
FIG. 15 is a fragmentary perspective view of the rotor core in FIG. 1, showing two first U-shaped formed wires and a second U-shaped formed wire inserted in the slots.
Figure 16:
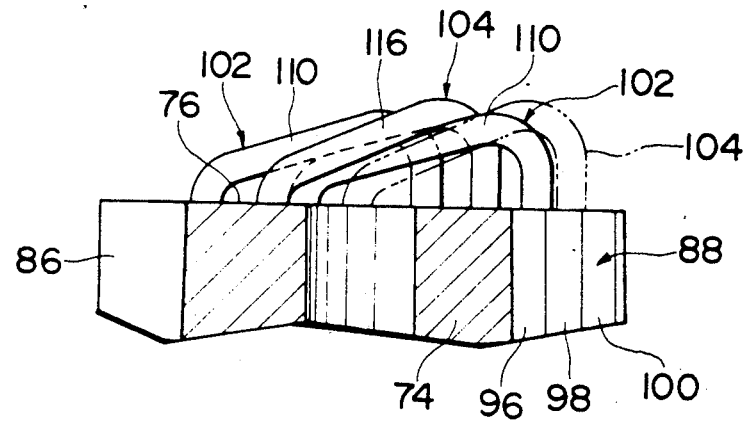
FIG. 16 is an axial-sectional view of the rotor core in FIG. 15.
Figure 18:
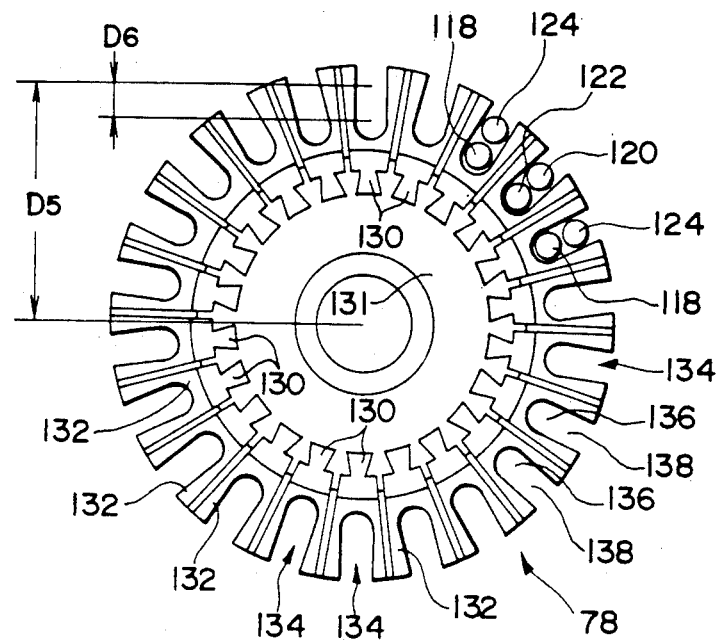
FIG. 18 is a front view of a commutator in FIG. 1, showing a number of distal end sections of the formed wires received in the notches of the commutator.
Figure 19:
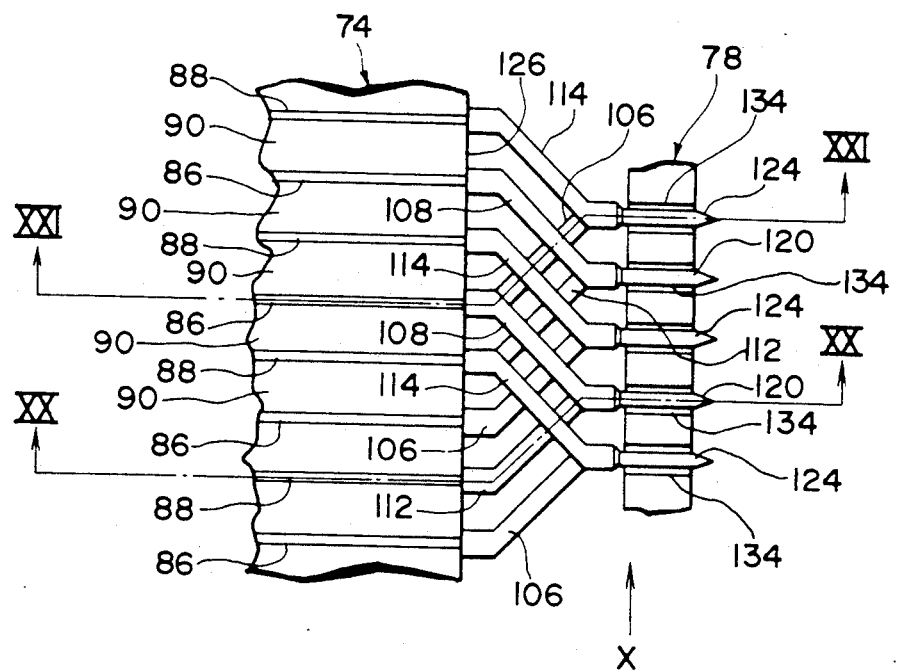
FIG. 19 is a fragmentary side-elevational view of the rotor core and the commutator in FIG. 1, showing the distal end sections of the formed wires which project from the rear end face of the core and are received in the notches of the commutator.
Figure 20:
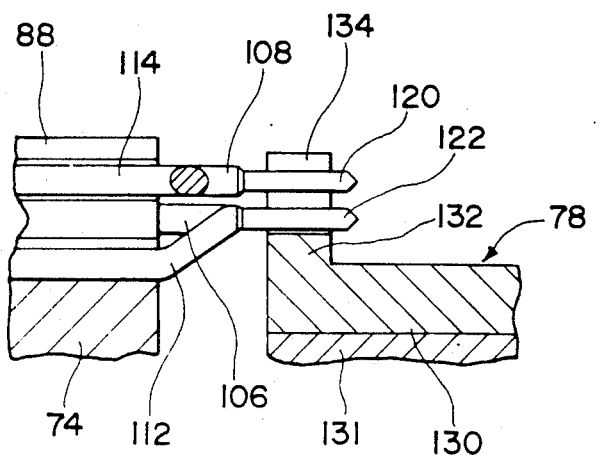
FIG. 20 is a view taken along the line XX—XX in FIG. 19.
Figure 21:
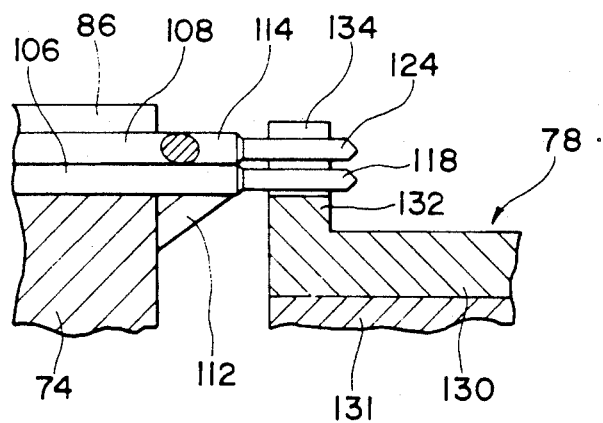
FIG. 21 is a view taken along the line XXI—XXI in FIG. 19.

On the other hand, each second formed wire 104 has its inner leg portion 112 inserted in the inner section 96 of a deeper slot 88 (namely, a 1st deeper slot), and has its outer leg portion 114 inserted in the outer section 100 of another deeper slot, i.e., the 3rd deeper slot 88 as counted clockwise from the 1st deeper slot 88 (see FIG. 7) As a result, the intermediate portions 116 of the second formed wires 104, each straddling four teeth 90, also project from the rear end face 76 of the core 74 (see FIGS. 6, 15, 16 and 17), and the distal end sections 122 (see FIGS. 18 and 20) and 124 of the second formed wires 104 also project from the front end face 126 of the core 74 (see FIGS. 19, 20 and 21). As viewed, in particular, in FIG. 16, the intermediate portions 116 appear inclined to the rear end face 76 of the core 74. As best shown in FIGS. 13 and 15, each intermediate portion 116 projecting from the rear end face 76 is routed along the following intermediate portion 110 in the counterclockwise direction, and crosses over the following intermediate portion 110 in the clockwise direction. More specifically, each intermediate portion 116, as shown in FIG. 13, is routed over the inner section 96 of the 2nd deeper slot 88 as well as over the inner section 92 of a shallower slot 86 between the 2nd and 3rd deeper slots 88 and 88, and, as shown in FIG. 16, is routed through a recess defined between the two adjacent intermediate portions 110 and 110. This means that at a position over the inner section 96 of the 2nd deeper slot, each intermediate portion 116 crosses over an intermediate portion 116 projecting from the inner section 96 of the 2nd deeper slot 88, and at a position over the inner section 92 of a shallower slot 86 between the 2nd and 3rd deeper slots 88 and 88, each intermediate portion 116 crosses over two intermediate portions, one intermediate portion being the following intermediate portion 110 in the clockwise direction, the other being an intermediate portion 110 crossing under the one intermediate portion 110 and projecting from the inner section 92 of the shallower slot 86 between the 2nd and 3rd deeper slot 88 and 88 (see FIGS. 13, 15 and 17). The above-mentioned arrangement of the intermediate portions 116 is possible since each second formed wire 104 includes a intermediate portion 116 curved accordingly and inclined to the rear end face 76, which enables the corresponding intermediate portion 116 to define a substantially right-triangle-shaped space (see FIG. 16) in cooperation with the rear end face 76 of the rotor core 74.

Figure 17:
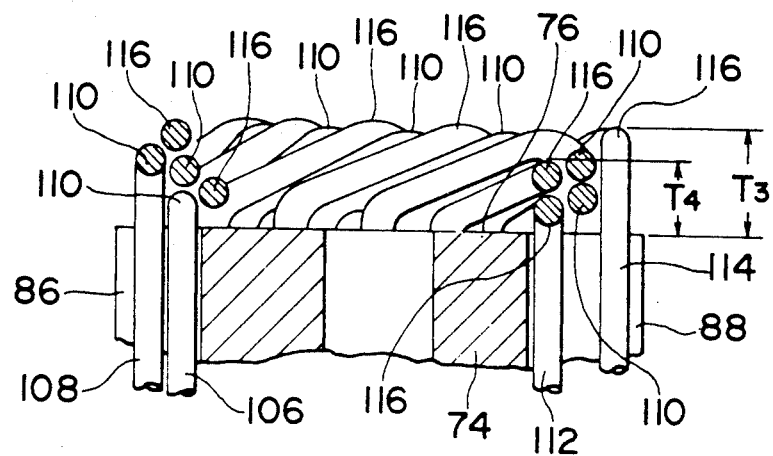
FIG. 17 is a fragmentary axial-sectional view of the rotor core in FIG. 14, showing the cross sections of intermediate portions projecting from the rear end face of the core.

From the aforementioned description, it should be understood that all the intermediate portions 110 and 116 as well as all the crossings of the neighboring intermediate portions 110 and 116 are disposed over the shallower and deeper slots 86 and 88 in other words, they are disposed within a radially outer region of the rear end face 76, outside an imaginary circle 128 (see phantom line FIG. 7) defined by the bottoms or radially inner ends of the deeper slots 88. Furthermore, since each second intermediate portion 116 crosses over one neighboring intermediate portion 116 at a position over the inner section 96 of a deeper slot and crosses over two neighboring intermediate portions 110 and 110 at a position over the inner section 92 of a shallower slot, the majority of the bulk of the intermediate portions 110 and 116 is distributed near the periphery of the rotor core 74 and relatively little of the bulk is distributed near the imaginary circle 128. That is, as shown in FIG. 17, the donut-shaped volume occupied by the intermediate portions 110 and 116 protruding from the rotor core 74 has a greater thickness $T_3$ at its outer periphery than the thickness $T_4$ at its inner periphery. This reduced bulk of the intermediate portions 110 and 116 near the radially inner region, as well as the bulk of the intermediate portions 110 and 116 disposed limitedly within the radially outer region of the rear end face 76, allows the central projection 59 of the rear end bracket 28 to be accommodated closer to the rotor core 74, and assures an adequate space between the central projection 59 and the intermediate portions 110 and 116 without lengthening the overall length of the DC motor. In addition, since each intermediate portion 116, as shown in FIG. 16, is routed through a recess defined between the two adjacent intermediate portions 110 and 110, the maximum thickness $T_3$ (see FIG. 17) of the bulk of the intermediate portions 110 and 116 is relatively reduced.

The best method of assembling the aforementioned rotor is as follows: first, the first formed wires 102 are inserted into the shallower slots 86 as shown by both the solid and phantom lines in FIG. 12; and then the second formed wires 104 are inserted into the deeper slots 88 as shown in FIG. 14. The insertion of either the first or second formed wires 102 or 104 may be accomplished one by one, or may be accomplished at the same time. In order to insert the first or second formed wires 102 or 104 at the same time, the first or second formed wires 102 or 104 are bound, by using a specific guiding tool, into a bundle in the same manner as they are in the respective slots. Then, the bundled formed wires are placed on the rear end face 76 of the core 78, and are slid in the longitudinal direction into the slots. As described before, the insertion of the second formed wires 104 after that of the first formed wires 102 is accommodated by the arrangement of the intermediate 110 of the first formed wires 102.

As shown in FIGS. 19, 20 and 21, the distal end sections 118, 120, 122 and 124 of the first and second formed wires 102 and 104 projecting from the front end face 126 of the rotor core 74 are electrically connected to the commutator 78, of which the structure will be described herein after.

As illustrated in FIG. 18, the commutator 78 is formed of a plurality of electrically conductive commutator segments 130 circumferentially disposed and embedded in the peripheral surface of a substantially cylindrical insulating matrix 131. The commutator segments 130 are electrically insulated from one another by the matrix 131 disposed thereamong. Each commutator segment 130 has a riser portion 132 projecting radially outward from the peripheral surface of the cylindrical matrix 131, and thus, the riser portions 132 as a whole form a flange portion which s larger in diameter than the cylindrical matrix 131 and generally equal in diameter to the core 74. Each riser portion 132 is provided with a radially extending notch 132, and thus, notches 134 of the same number as the sum (which is twenty-two in this embodiment) of the respective numbers of shallower and deeper slots 86 and 88 are circumferentially disposed in the flange portion at equal intervals about the axis of the commutator 78. These notches 134 are of an elliptical shape with a circumferential length generally equal to the diameter of a distal end section of a formed wire 102 or 104 and a radial length generally equal to twice the diameter of a distal end section of a formed wire 102 or 104, and therefore, the bottoms or radially inner ends of the notches 134 are aligned along an imaginary circle of a diameter slightly larger than an imaginary circle defined by the bottoms of the shallower slots 86. Each notch 134 has inner and outer sections 136 and 138, each being adapted to receive a distal end section of a formed wire 102 or 104. The distance $D_5$ between the axis of the commutator and the outer section 138 of each notch 134 is nearly equal to the distance $D_1$ or $D_2$, and the distance $D_6$ between the inner and outer sections 136 and 138 of each notch is slightly smaller than the distance $D_4$. As described before, the distal end sections 118, 120, 122 and 124 of the first and second formed wires 102 and 104 are slightly smaller in diameter than the other sections so that the width of the notches 134 can be decreased accordingly. This allows the distances among the notches 134 to be maximized and thereby allows those portions of the commutator 78 among the notches 134 to have appropriate thicknesses for assuring their mechanical strength. Therefore, the notches 134 are enabled to be circumferentially arranged at a pitch equal to the pitch at which the shallower slots 86 and deeper slots 88 are arranged in the rotor core 74.

As shown in FIGS. 18 and 19, the inner section 136 of each notch 134 of the commutator 78 receives the distal end section 118 or 122 of an inner leg portion 106 or 112, while the outer section 138 of each notch 134 receives the distal end section 120 or 124 of an outer leg portion 108 or 114. More specifically, since the front pitch of the rotor coil 84 is three in this embodiment, every other notch 134 receives: the distal end section 118 of the inner leg portion 106 of a first formed wire 102, projecting from the inner section 92 of a (1st) shallower slot 86; and the distal end section 124 of the outer leg portion 114 of a second formed wire 104, projecting from the outer section 100 of a deeper slot 88, i.e., the 4th slot as counted along the circumference from said 1st shallower slot 86. On the other hand, each of the other notches 134 receives: the distal end section 122 of the inner leg portion 112 of a second formed wire 104, projecting from the inner section 96 of a (1st) deeper slot 88; and the distal end section 120 of the outer leg portion 108 of a first formed wire 102, projecting from the outer section 94 of a shallower slot 86, i.e., the 4th slot as counted along the circumference from said 1st deeper slot 88. That is, those distal end portions received in the same notch are electrically connected to each other to form the rotor coil 84.

To insert the distal end sections 118, 120, 122 and 124 of the formed wires 102 and 104 into the respective notches 134, the leg portions 106, 108, 112 and 114 projecting from the front end face 126 are bent in a manner as follows.

The inner leg portions 106 of the first formed wires 102, which project from the inner sections 92 of the shallower slots 86, are bent at the points of projection from the rotor core 74, in the clockwise direction indicated by arrow X in FIG. 19. Then, they are routed diagonally and are bent again in front of the corresponding notches 134 so as to be parallel to the axis of the commutator 78, followed by engagement of their distal end sections 118 with the bottoms of the corresponding notches 134. In contrast, the inner leg portions 112 of the second formed wires 104, which project from the inner sections 96 of the deeper slots 88, are bent at the points of projection from the rotor core 74 in the clockwise direction indicated by arrow X in FIG. 19 and, at the same time, toward the periphery of the flange portion of the commutator 78 (see FIGS. 20 and 21). Then, the inner leg portions 112 are routed toward the corresponding notches 134, and are bent again in front of the corresponding notches 134 so as to be parallel to the axis of the commutator 78, followed by engagement of their distal end sections 122 with the bottoms of the corresponding notches 134. Returning to FIG. 19, the outer leg portions 108 and 114 of the first and second formed wires 102 and 104 are bent at the points of projection from the rotor core 74 in the counterclockwise direction. Then, they are routed diagonally and bent again in front of the corresponding notches 134 so as to be parallel to the axis of the commutator 78, followed by engagement of their distal end sections 120 and 124 with the internal walls of the corresponding notches 134. These distal end sections 118, 120, 122 and 124 are fixed to the corresponding commutator segments 130 by means of, for example, soldering or ultrasonic welding.

In the aforementioned arrangement of the distal end sections of the formed wires 102 and 104, the inner leg portions 112 of the second formed wire 104 are bent circumferentially and radially outwardly, and are routed into the inner sections 136 of the notches 134, which are disposed along an imaginary circle of nearly the same diameter as an imaginary circle defined by the bottoms of the shallower slots 86 of the core 74. The notches 134 of the riser portions 132, therefore, are not necessarily deepened or elongated in order to be accommodated to the distal end sections 112 of the second formed wires 104 which project from the inner sections 96 of the deeper slots 88. This, in cooperation with the decreased diameter of the distal end sections 118, 120, 122 and 124, prevents the decrease of the distances among the notches 134 of the commutator 78, in other words, this assures the adequate thicknesses and mechanical strength of those portions among the notches 134. In addition, the distal end sections of the first and second formed wires 102 and 104 are merely utilized for the engagement with the commutator 78, and are not disposed in the slots 86 and 88. Therefore, the distal end sections 118, 120, 122 and 124 do not affect the performance of the DC motor. Furthermore, since the inner leg portions 112 received in every other notch 134 of the commutator 78 are bent radially inward as shown in FIG. 20, and since the inner leg portions 106 received in the other notches 134 are not bent radially as shown in FIG. 21, the inner leg portions 106 and 112 can be distributed over more space between the rotor core 74 and the commutator 78 than the inner leg portions of the conventional DC motor, resulting in decrease of the density of the inner leg portions 106 and 112 extending between the core 74 and the commutator 78. Consequently, highly reliable wiring and connection of the inner leg portions 106 and 112 can be easily achieved. The bending of the inner leg portions 112 projecting from the inner sections 96 of deeper slots 88 may be performed in two steps, i.e., bending them radially outward, followed by bending them in the clockwise direction. Otherwise, the above-mentioned steps may be achieved in one step.

Figure 22:
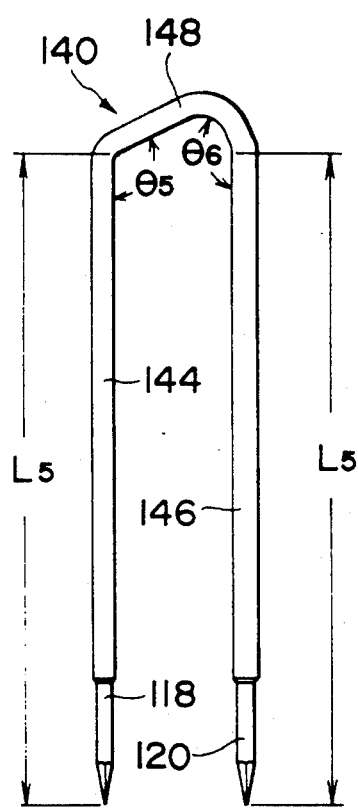
FIG. 22 is a side-elevational view of a modified form of the first U-shaped formed wire in FIG. 8.
Figure 23:
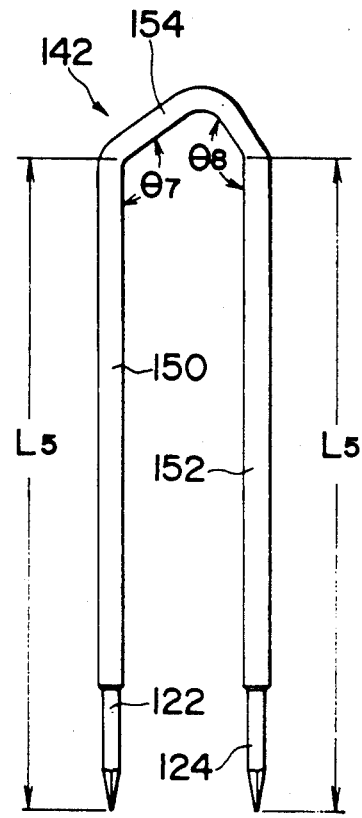
FIG. 23 is a side-elevational view of a modified form of the second U-shaped formed wire in FIG. 9.

FIGS. 22 and 23 illustrate modified forms of the first and second U-shaped formed wires shown in FIGS. 8 and 9, respectively. That is, first formed wires 140 of a configuration shown in FIG. 22 may be used in place of the first formed wires 102 together with second formed wires 142 of a configuration shown in FIG. 23, replaced by the second formed wires 104. Each first formed wire 140 has inner and outer leg portions 144 and 146 of the same length $L_5$ and a bowed or double-inclined intermediate portion 148. The intermediate portion 148 and the inner leg portion 144 define therebetween an angle 85 larger than 90° while the therebetween an angle 86 larger than the angle $\theta_5$. The manner in which the intermediate portion 148 appears curved when the intermediate portion 148 is viewed in a rear view is similar to the manner shown in FIG. 10. The other features of each first formed wire 140 are identical to those of each first formed wire 102. On the other hand, each second formed wire 142 also has inner and outer leg portions 150 and 152 of the same length equal to the length $L_5$ and a bowed or double-inclined intermediate portion 154. The intermediate portion 154 and the inner leg portion 150 define therebetween an angle $\theta_7$ slightly larger than the angle $\theta_5$ while the intermediate portion 154 and the outer leg portion 152 define therebetween an angle $\theta_8$ slightly larger than the angle $\theta_6$. The manner in which the intermediate portion 154 appears curved when the intermediate portion 154 is viewed in a rear view is similar to the manner shown in FIG. 11. The other features of each second formed wire 142 are identical to those of each second formed wire 104. By employing these first and second formed wires 140 and 142 in place of the first and second formed wires 102 and 104 respectively, substantially the same advantage as is obtained by the first and second formed wires 102 and 104 can be obtained.

Although the rotor coil 84 in the foregoing embodiment are wound with a back pitch of four and a front pitch of three, it should be readily apparent that the present invention is applicable to other cases with different pitches. For example, when the back pitch is an odd number, each first formed wire 102 may have its outer leg portion 108 inserted in the outer section 100 of a deeper slot 88, and each second formed wire 104 may have its outer leg portion 114 inserted in the outer section 94 of a shallower slot 86.

What is claimed is:

1. In a DC motor which includes: a motor case; a substantially cylindrical rotor core rotatably disposed in the motor case for rotation about a center axis thereof and having a peripheral surface and front and rear end faces; and a rotor coil wound around the rotor core, the rotor core having a plurality of shallower slots and a plurality of deeper slots, the shallower and deeper slots being circumferentially and alternately disposed in the peripheral surface of the rotor core at angular intervals about the center axis of the rotor core, each of the shallower and deeper slots extending axially from the front end face to the rear end face of the rotor core so that axially extending teeth are formed between the shallower and deeper slots, each of the shallower slots including inner and outer sections which are radially aligned with each other, each of the deeper slots including inner and outer sections radially spaced apart and a neck section interposed between the inner and outer sections, a distance between the center axis of the rotor core and the outer section of each shallower slot being generally equal to a distance between the center axis of the rotor core and the outer section of each deeper slot, a distance between the inner and outer sections of each deeper slot being larger than a distance between the inner and outer sections of each shallower slot, the neck section of each deeper slot being of a circumferential length smaller than circumferential lengths of the inner and outer sections of each deeper slot, the rotor coil comprising a plurality of first formed wires and a plurality of second formed wires, each of the first and second formed wires being U-shaped and each including inner and outer leg portions and an intermediate portion, each of said inner and outer leg portions having distal and proximal ends, said intermediate portion interconnecting the proximal ends of the inner and outer leg portions, an angle defined between the inner leg portion and the intermediate portion being larger than 90°, each of the first and second formed wires having said inner leg portion inserted in the inner section of a respective one of a shallower and deeper slot and having said outer leg portion inserted in the outer section of an Nth slot as counted in a circumferential direction from the slot in which a corresponding one of the inner leg portions is inserted so that each of the first and second formed wires straddles (N−1) of said teeth with said intermediate portion projecting from and being inclined to the rear end face of the rotor core, said N being a positive integer greater than two, said intermediate portions of the first and second formed wires occupying a donut-shaped volume on the rear end face of the rotor core, said donut-shaped volume having an inner periphery and having an outer periphery which is both radially outside of the thicker than said inner periphery.

2. A DC motor according to claim 1, wherein the inner leg portions of the first formed wires are inserted respectively in the inner sections of the shallower slots, the inner leg portions of the second formed wires being inserted respectively in the inner sections of the deeper slots, said intermediate portions of said first and second formed wires generally projecting farther from the respective end face in proximity to said outer leg portion then in proximity to said inner leg portion, the intermediate portion of each first formed wire being routed over the neck section of any deeper slot which intervenes between the corresponding inner and outer leg portions so as to avoid covering the inner and outer sections of the intervening deeper slot, and the intermediate portion of each second formed wire being routed along the intermediate portion of a first formed wire preceding in said circumferential direction and crosses over the intermediate portion of a first formed wire following in said circumferential direction.

3. A DC motor according to claim 2, wherein the intermediate portion of each second formed wire is routed through a recess defined between the two intermediate portions of two adjacent first formed wires.

4. A DC motor according to claim 3, wherein the outer leg portions of the first formed wires are inserted respectively in the outer sections of the shallower slots, and wherein the outer leg portions of the second formed wires are inserted respectively in the outer sections of the deeper slots.

5. A DC motor according to claim 4, wherein the intermediate portions of the first and second formed wires are disposed within a ring-shaped radially outer region of the rear end face of the rotor core, the outer region being outside of an imaginary circle defined by bottoms of the deeper slots, the thickness of the donut-shaped volume occupied by the intermediate portions of the first and second formed wires being larger at an outer periphery of said donut-shaped volume than at an inner periphery of said donut-shaped volume.

6. A DC motor according to claim 3, wherein the intermediate portion of each of the first and second formed wires appears straight when the intermediate portion is viewed from a plane parallel to both corresponding inner and outer leg portions, an angle defined between the outer leg portion and intermediate portion of each of the first and second formed wires being smaller than 90°.

7. A DC motor according to claim 6, wherein the angle defined between the inner leg portion and intermediate portion of each second formed wire is larger than the angle defined between the inner leg portion and intermediate portion of each first formed wire, the angle defined between the outer leg portion and intermediate portion of each second formed wire being smaller than the angle defined between the outer leg portion and intermediate portion of each first formed wire.

8. A DC motor according to claim 3, wherein the intermediate portion of each of the first and second formed wires appears bowed or double-inclined when the intermediate portion is viewed from a plane parallel to both corresponding inner and outer leg portions, the angle defined between the outer leg portion and intermediate portion of each of the first and second formed wires being larger than the angle defined between the inner leg portion and intermediate portion of each of the first and second formed wires and larger than the angle defined between the outer leg portion and intermediate portion of each first formed wire.

9. A DC motor according to claim 8, wherein the angle defined between the inner leg portion and intermediate portion of each second formed wire is substantially larger than the angle defined between the inner leg portion and intermediate portion of each first formed wire, and wherein the angle defined between the outer leg portion and intermediate portion of each second formed wire is substantially larger than the angle defined between the outer leg portion and intermediate portion of each first formed wire.

10. A DC motor according to claim 2, further comprising a substantially cylindrical commutator coaxially and fixedly connected to the rotor core so as to be opposed to the front end face of the rotor core, the commutator having a peripheral surface and a plurality of notches circumferentially disposed in the peripheral surface at equal angular intervals about the axis of the commutator, each of the notches including inner and outer radially aligned section, a circumferential length of each notch being generally equal to a diameter of a distal end of each of the first and second formed wires, a distance between the center axis of the rotor core and the inner section of each deeper slot, and the distal ends of the first and second formed wires being of a diameter substantially smaller than the diameter of the other portions of the first and second formed wires, each distal end having a constant diameter for a certain length, the distal ends of the first and second formed wires projecting from the front end face of the rotor core toward the commutator and being received in the notches of the commutator for obtaining electrical connection.

11. A DC motor according to claim 10, wherein the distal ends projecting from the inner sections of the deeper slots are bent radially outward so as to be accommodated to the inner sections of the notches.

12. A DC motor comprising:
   a motor case having a front bracket face, a rear bracket face, and a central projection extending from said rear bracket face;
   a rotor core rotatably disposed in said motor case for rotation about a center axis of said rotor core, said core having an outer peripheral surface, a center area spaced radially inside of said peripheral surface, and front and rear end faces which are respectively opposed to said front and rear bracket faces; and
   a rotor coil comprising first and second pluralities of U-shaped wires, each of said wires of said first and second pluralities of U-shaped wires including inner and outer leg portions and an intermediate portion, each of said inner and outer leg portions having distal and proximate ends, said proximate ends of said inner and outer leg portions being interconnected by a respective one of said intermediate portions, said inner and outer leg portions being radially spaced from each other such that said inner leg portions are closer to said center area of said rotor core than are said outer leg portions, said rotor coil being wound around said rotor core so that said intermediate portions occupy a donut-shaped volume on said rear end face of said rotor core, the donut-shaped volume having an outer periphery and an inner periphery radially inside of the outer periphery, said outer periphery of the donut-shaped volume being thicker than said inner periphery, a majority of said intermediate portions being distributed closer to said outer peripheral surface of said rotor core than to said center area of said rotor core, whereby adequate space is provided between said intermediate portions and said central projection for accommodating the central projection closer to the rotor core without also lengthening an overall length of the DC motor to provide the adequate space.

13. A DC motor according to claim 12, wherein said rotor core has a plurality of slots circumferentially disposed in said outer peripheral surface of said rotor core at angular intervals about said center axis of said rotor core, each of said slots extending axially from said front end face to said rear end face of said rotor core so as to form axially extending teeth between said slots, each of said U-shaped wires having a respective inner leg portion inserted into said slots and a respective outer leg portion inserted into an Nth slot as counted in a circumferential direction from said slot into which is inserted said respective inner leg portion so that each of said U-shaped wire straddles (N−1) of said teeth with a respective intermediate portion projecting from and being inclined to said rear end face of said rotor core, said N being a positive integer greater than two, said intermediate portions occupying a donut-shaped volume on said rear end of said rotor core.

14. A DC motor according to claim 13, wherein said slots include shallower slots and deeper slots alternately disposed in said outer peripheral surface, each of said shallower slots including inner and outer sections which are radially aligned with each other, each of said deeper slots including inner and outer sections which are radially spaced from each other and further including a neck section interposed between said inner and outer sections, said inner leg portions being inserted into said inner sections of said slots and said outer leg portions being inserted into said outer sections of said slots.

15. A DC motor according to claim 14, wherein said shallower and deeper slots are arranged so that a distance between said center axis of said rotor core and said outer section of each of said shallower slots is equal to a distance between said center axis of said rotor core and said outer section of each of said deeper slots and a distance between said inner and outer sections of each deeper slot is larger than a distance between said inner and outer sections of said shallower slot, said neck section of each of said deeper slots being of a circumferential length smaller than circumferential lengths of said inner and outer sections of each of said deeper slots.

16. A DC motor according to claim 12, wherein an angle defined between said inner leg portion and said intermediate portion of each of said first and second U-shaped wires is larger than 90°.

17. A rotor core and rotor coil for use in a DC motor which has a motor case in which may be rotatably disposed the rotor core for rotation about a center axis thereof, the rotor core comprising
   a peripheral surface and front and rear end faces, the rotor core being substantially cylindrical and having a plurality of shallower slots and a plurality of deeper slots, the shallower and deeper slots being circumferentially and alternately disposed in the peripheral surface of the rotor core at angular intervals about the center axis of the rotor core, each of the shallower and deeper slots extending axially from the front end face to the rear end face of the rotor core so that axially extending teeth are formed between the shallower and deeper slots, each of the shallower slots including inner and outer sections which are radially aligned with each other, each of the deeper slots including inner and outer sections radially spaced apart and a neck section interposed between the inner and outer sections, a distance between the center axis of the rotor core and the outer section of each shallower slot being generally equal to a distance between the center axis of the rotor core and the outer section of each deeper slot, a distance between the inner and outer sections of each deeper slot being larger than a distance between the inner and outer sections of each shallower slot, the neck section of each deeper slot being of a circumferential length smaller than circumferential lengths of the inner and outer sections of each deeper slot, and the rotor coil comprising a plurality of first formed wires and a plurality of second formed wires, each of the first and second formed wires being U-shaped and each including inner and outer leg portions and an intermediate portion, each of said inner and outer leg portions having distal and proximal ends, said intermediate portion interconnecting the proximal ends of the inner and outer leg portions, an angle defined between the inner leg portion and the intermediate portion being larger than 90°, each of the first and second formed wires having said inner leg portion inserted in the inner section of a respective one of a shallower and deeper slot and having said outer leg portion inserted in the outer section of an Nth slot as counted in a circumferential direction from the slot in which a corresponding one of the inner leg portions is inserted so that each of the first and second formed wires straddles (N−1) of said teeth with said intermediate portion projecting from and being inclined to the rear end face of the rotor core, said N being a positive integer greater than two, said intermediate portions of the first and second formed wires occupying a donut-shaped volume on the rear end face of the rotor core, the donut-shaped volume having an inner periphery and having an outer periphery which are both radially outside of and the outer periphery is thicker than said inner periphery.

18. A DC motor according to claim 17, wherein the inner leg portions of the first formed wires are inserted respectively in the inner sections of the shallower slots, the inner leg portions of the second formed wires being inserted respectively in the inner sections of the deeper slots, said intermediate portions of said first and second formed wires generally projecting further from the respective end face in proximity to said outer leg portion than in proximity to said inner leg portion, the intermediate portion of each first formed wire being routed over the neck section of any deeper slot which intervenes between corresponding inner and outer leg portions so as to avoid covering the inner and outer sections of the intervening deeper slot, the intermediate portion of each section formed wire being routed along the intermediate portion of a first formed wire preceding in said circumferential direction and crossing over the intermediate portion of a first formed wire following in said circumferential direction.

19. A DC motor according to claim 18, wherein the intermediate portion of each second formed wire is routed through a recess defined between the two intermediate portions of two adjacent first formed wires.

20. A DC motor according to claim 19, wherein the outer leg portions of the first formed wires are inserted respectively in the outer sections of the shallower slots, and wherein the outer leg portions of the second formed wires are inserted respectively in the outer sections of the deeper slots.

21. A DC motor according to claim 20, wherein the intermediate portions of the first and second formed wires are disposed within a ring-shaped radially outer region of the rear end face of the rotor core, the outer region being outside of an imaginary circle defined by bottoms of the deeper slots.

22. A DC motor according to claim 19, wherein the intermediate portion of each of the first and second formed wires appears straight when the intermediate portion is viewed from a plane parallel to both corresponding inner and outer leg portions, an angle defined between the outer leg portion and intermediate portion of each of the first and second formed wires being smaller than 90°.

23. A DC motor according to claim 22, wherein the angle defined between the inner leg portion and intermediate portion of each second formed wire is larger than the angle defined between the inner leg portion and intermediate portion of each first formed wire, the angle defined between the outer leg portion and intermediate portion of each second formed wire being smaller than the angle defined between the outer leg portion and intermediate portion of each first formed wire.

24. A DC motor according to claim 19, wherein the intermediate portion of each of the first and second formed wires appears bowed or double-inclined when the intermediate portion is viewed from a plane parallel to both corresponding inner and outer leg portions, the angle defined between the outer leg portion and intermediate portion of each of the first and second formed wires being larger than the angle defined between the inner leg portion and intermediate portion of each of the first and second formed wires and larger than the angle defined between the outer leg portion and intermediate portion of each first formed wire.

* * * * *